United States Patent [19]

Chakrabarti et al.

[11] 4,341,686

[45] Jul. 27, 1982

[54] ADHESIVE PRODUCTS AND A PROCESS FOR THEIR USE IN POLYURETHANES

[75] Inventors: Sarbananda Chakrabarti, Ludwigshafen; John Hutchison, Wachenheim; Otto Volkert, Weisenheim, all of Fed. Rep. of Germany

[73] Assignee: BASF Aktiengesellschaft, Ludwigshafen, Fed. Rep. of Germany

[21] Appl. No.: 287,878

[22] Filed: Jul. 29, 1981

[30] Foreign Application Priority Data

Aug. 5, 1980 [DE] Fed. Rep. of Germany ....... 3029583

[51] Int. Cl.$^3$ ................................................ C08K 3/28

[52] U.S. Cl. .................................... 427/244; 427/327; 524/360; 524/567

[58] Field of Search .......... 260/32.4, 29.15 B, 30.4 R, 260/32.6 R

[56] References Cited

U.S. PATENT DOCUMENTS 4,146,511 3/1979 Moriya et al. ................ 260/33.4 R Primary Examiner—Joseph L. Schofer
Assistant Examiner—N. Sarofim
Attorney, Agent, or Firm—Norbert M. Lisicki

[57] ABSTRACT

Adhesive products comprising an aminoalkyltrialkoxysilane, polyvinyl chloride powder, silicic acid and an organic solvent are employed to attach cover layers to cellular and non-cellular polyurethanes.

12 Claims, No Drawings

4,341,686

ADHESIVE PRODUCTS AND A PROCESS FOR THEIR USE IN POLYURETHANES

BACKGROUND OF THE INVENTION

1. Field of the Invention

The products of this invention are adhesive products containing (a) an aminoalkyltrialkoxysilane, (b) a fine particle size polyvinyl chloride powder and/or (c) an amorphous hydrophobic silicic acid and (d) organic solvents. The adhesive products are employed for attaching cover layers of all types of cellular and non-cellular polyurethanes.

2. Description of the Prior Art

A prerequisite for attaching solid cover layers of identical or other optionally fiber-reinforced plastics, wood or metal to foamed plastics is sufficient adhesion of the foamed plastic to the cover layers. For sandwich constructions, for instance, the adhesion of the foamed plastic to the cover layer must be greater than the internal stability of the foamed plastic in order to avoid lifting of the cover layer as a result of buckling or bending [kinking] of the overall construction.

In order to improve the adhesiveness of polyurethane foams, it has been suggested to roughen the cover layer, for instance by sanding or sand blasting, and to cover this layer with a prime coat with a reaction accelerator such as a tertiary amine or metal salt for the foaming process. Another solution is priming the cover layer with adhesive based on polyurethane polyester resin, oxide resin or nitrile or rubber. The improved adhesion achieved with this process, however, is insufficient for many areas of application.

It is further known that the combination of organic resins such as epoxide-, unsaturated polyester-, phenol-, melamine resins and polymers such as styrene-, butadiene-, styrene-acrylonitrile polymers, polyamide, polypropylene and polyesters with hydrophilic mineral fibers can be improved by traces of reactive silanes as cross-linking agents. On the other hand, the use of silanes as adhesives for polyurethane is not mentioned.

DESCRIPTION OF THE PREFERRED EMBODIMENT

The purpose of this invention was to improve the adhesion of polyurethanes to cover layers, most particularly, cover layers of metal.

Surprisingly, this purpose could be met with the aid of the adhesives according to this invention.

The object of this invention are therefore adhesives which comprise (a) 1 to 10 percent by weight of an aminoalkyltrialkoxysilane, (b) 1 to 20 percent by weight of a fine particle size polyvinyl chloride powder, and/or (c) 0.1 to 5 percent by weight of an amorphous hydrophobic silicic acid, and (d) 98 to 65 percent by weight of at least one organic solvent based on the total weight.

Surprisingly, it was found that mixtures of (a) aminoalkyltrialkoxysilanes and (b) polyvinylchloride powder or (c) amorphous hydrophobic silicic acids dissolved in (d) organic solvents and particularly methylene chloride-containing solvent mixtures considerably increase the adhesive strength of polyurethanes to cover layers. It was also found that these adhesives inhibit swelling and specimens exposed to heat, salt spray and wax removal display good heat stability with a very high adhesive strength. Additionally, a thickening effect occurs and thus these solutions can be processed easier and will adhere better to the cover layers.

Another advantage is that the adhesive agents can be handled easily and economically as a one component system. The cover layers coated with the adhesive product can be dried at temperatures below 80° C. so that the energy demand in this regard is lower than in the case of traditional adhesive products. The preparations and/or cleaning of the cover layers with soapy water and a solvent mixture is considerably more environmentally sound than the previously used processes such as etching and passivating of the surfaces with acids.

The following should be noted concerning the starting components (a) to (c) of mixtures to be used as adhesives as well as (d) the organic solvent:

Proven to have worked well as (a) the aminoalkyltrialkoxysilanes are amino group, preferably primary terminal amino group-containing, trialkoxysilanes having 1 to 8, preferably 2 to 5 carbon atoms in the alkyl radical with the alkyl radical containing bridge members of hetero atoms, for instance, oxygen, sulfur or NH groups in bonded form and 1 to 4, preferably 1 to 2 carbon atoms in the alkoxy radical. Among these are: γ-aminodiethylene ethertrimethoxysilane, γ-aminodiethylene ether-triethoxysilane, γ-(β-aminoethyl)-aminobutyltrimethoxysilane, γ-(β-aminoethyl)-aminobutyltriethoxysilane, γ-aminoethyltrimethoxysilane, γ-aminobutyltriethoxysilane, γ-aminohexyltriethoxysilane, γ-aminohexyltrimethoxysilane, and preferably γ-aminopropyltriethoxysilane. The aminoalkyltrialkoxysilanes may be used individually as well as mixtures thereof.

Suitable fine particle size (b) polyvinylchloride powders have K values of 55 to 80, preferably 60 to 75; bulk densities of 0.3 to 0.5, preferably 0.35 to 0.45 grams per cubic centimeter and less than 1 percent of the particles are equal to or greater than 60 microns. Fine particle size polyvinylchloride powders of this type are commercial products and may be procured, for instance, from BASF Aktiengesellschaft under the trademark of ®Vinoflex KR 3362.

The (c) amorphous hydrophobic silicic acids are products having particle diameters of 10 to 40 microns, preferably 12 to 30 microns; bulk densities of approximately 30 to 60 grams per liter, preferably 40 to 50 grams per liter, and BET surfaces [BET stands for Brunauer Emit Teller and is a standard surface determination test] of 90 to 175 square meters per gram, preferably 90 to 150 square meters per gram, which are produced, for instance, by water hydrolysis of a mixture of hydrophilic silicone dioxide and dimethyldichlorosilane. An amorphous hydrophobic silicic acid which can be used in accordance with this invention is commercially available under the tradename of ®Aerosil R 972 by Degussa.

Organic solvents (d) are advantageously those in which the starting components (a) to (c) are completely soluble and which are miscible with methylene chloride in order to reduce the flammability. Among the solvents contemplated are: dimethylformamide, tetrahydrofuran, methylene chloride, ethanol and preferably cyclohexanone. Preferably used are solvent mixtures consisting of the above-mentioned solvents and methylene chloride which contain 40 to 80, preferably 45 to 55 percent by weight of methylene chloride based on the total weight of solvent. A mixture of cyclohexanone and methylene chloride in a weight ratio of approximately 50:50 has proven to work particularly well.

For the manufacture of the adhesives, the starting components (a) to (c) are dissolved individually in sequence or preferably at the same time, and possibly while being stirred and heated in the (d) organic solvents in such quantities that the adhesive products preferably consist of, based on the total weight, (a) 1 to 10 percent by weight, preferably 1 to 5 percent by weight of an aminoalkyltrialkoxysilane, (b) 1 to 20 percent by weight, preferably 1 to 5 percent by weight of a fine particle size polyvinylchloride powder, and/or (c) 0.1 to 5 percent by weight, preferably 0.1 to 2 percent by weight of an amorphous hydrophobic silicic acid, and (d) 65 to 98 percent by weight, preferably 88 to 98 percent by weight, of at least one organic solvent.

The adhesive products according to this invention are advantageously used for attaching rigid cover layers to non-cellular and preferably cellular polyurethanes. Examples of cellular polyurethanes include: polyurethane integral foams, preferably those with overall densities of 300 to 1100 grams per liter, rigid polyurethane foams as they are normally used for sandwich constructions, and preferably cellular polyurethane foam parts which are produced in accordance with the RIM technology. Suitable cover layers include: reinforcing agents such as inorganic or organic fillers, glass or coal fiber-containing plastics based on polyesters, polyamides, polycarbonate, polyethylene, polypropylene, epoxide, melamine, urea, melamineurea resins and preferably polyvinylchloride and unsaturated polyester resins, wood, for example, plywood or chipboards and particularly metals, for example, steel sheet and preferably aluminum.

In order to achieve better adhesion, the cover layers are advantageously cleaned prior to being coated with the adhesive product. This may be done, for instance, by washing the surface of the cover layer with an aqueous surfactant solution, rinsing and drying. Advantageously, the cover layers, particularly those of aluminum, are subsequently also treated with a solvent mixture, for instance, consisting of ethanol, acetone and methylene chloride in a weight ratio of 1:1:1 and are then dried at temperatures of approximately 23° C. to 80° C.

The adhesive product is applied to the cleaned and degreased cover layers, for instance, by brushing, spraying or preferably by means of a spray gun, and is dried at temperatures of approximately 20° C. to 120° C., preferably 50° C. to 80° C. The prepared cover layers are then covered with the foamable polyurethane mass.

The following Examples are provided to illustrate the invention described herein. The parts referred to in the examples are parts by weight.

EXAMPLES 1-9 AND COMPARATIVE EXAMPLES A AND B

General Procedure

With stirring, λ-aminopropyltriethoxysilane, a fine particle size polyvinylchloride powder (commercial product Vinoflex KR 3362 by BASF Aktiengesellschaft) and/or an amorphous hydrophobic silicic acid (commercial product Aerosil R 972 by Degussa AG) in the quantities referred to in Table 1 are added to the organic solvent and/or solvent mixture at 23° C. The mixture is stirred at 23° C. (approximately 3 to 6 hours) until a homogenous solution is formed.

Composite Materials

An aluminum sheet having dimensions of 90×30×0.15 to 0.2 centimeters is washed well with an aqueous surfactant solution, is rinsed until clear and is dried at 80° C. The dry aluminum sheet is then again carefully cleaned with a solvent mixture consisting of ethanol, acetone and methylene chloride in a weight ratio of 1:1:1 and is dried at 80° C.

With the aid of a spray gun connected to dry compressed air, the adhesive product is sprayed onto one side of the dry aluminum sheet. The aluminum sheet treated in this manner is dried at 80° C. for 15 minutes.

The pre-treated aluminum sheet is placed into a metal form having dimensions of 90×30×0.36 centimeters and heated to 55° C. in such a manner that the surface coated with the adhesive product faces the hollow area of the mold. The mold is closed and is filled with 850 grams of a two-component polyurethane system which reacts in the mold and consists of:

Component A 74.9 parts by weight of a commercially available trifunctional polyether polyol based on propylene-ethylene oxide and having an OH number of 30,
20 parts by weight of 1,4-butanediol,
5 parts by weight of fluorotrichloromethane,
0.05 parts by weight of dibutyltin dilaurate, and
0.05 parts by weight of triethylenediamine.

Component B

Commercially available carbodiimide modified 4,4'-diphenylmethane diisocyanate.

Mixing ratio of components A:B=5.0 parts: 3.5 parts.

The mold temperature is 50° C. and the demold time of the polyurethane is approximately 2 minutes.

Testing of the adhesion stability

Test bodies (30×6 centimeters) were sawed from the resultant molded body, covered with aluminum sheet and were stored at 25° C. for 3 days. Following this period, the following tests were conducted:

(1) Aging: the sample bodies for the age test were subjected to the following cycle 5 times:

| Storage: | 4 hours at +80° C., |
| | 4 hours at −30° C., and |
| | 16 hours in a condensing water atmosphere according to DIN 50 017 SK. |

This cycle was followed by 168 hours of salt spray test according to DIN 50 021.

(2) Heat Storage: the sample bodies were stored for 1 hour at 120° C. in a circulating air furnace.

(3) Wax Removal: the sample bodies were sprayed with the VB 195 wax manufactured by Pfinders in Boeblingen, and were stored at 25° C. for 1 week. After this storage period the wax was washed off with a 70° C. hot aqueous solution of a surfactant (2 parts by weight of water per 1 part by weight of shampoo APFG 75 by Pfinders in Boeblingen).

After completing the respective storage tests (1) to (3), the sample tests were stored at 25° C. for 48 hours and following this, the adhesion stability was measured according to DIN 53 530.

The results obtained are summarized in Table I.

In Table II, the abbreviation Sb indicates that the foam broke before the foam part could be removed from the aluminum cover layer, that is, the adhesion of the polyurethane foam to the cover layer is greater than its internal strength (tensile strength).

TABLE I

| Example | Comparison Examples | Solvent Mixture Type | Weight Ratio | Parts by Weight | γ-Aminopropyl ethoxysilane Parts by Weight | Vinoflex KR 3362 Parts by Weight | Aerosil R 972 Parts by Weight |
|---|---|---|---|---|---|---|---|
| | A | Cyclohexanone/Methylene Chloride | 50:50 | 100 | — | — | — |
| | B | Cyclohexanone/Methylene Chloride | 50:50 | 95 | 5 | — | — |
| 1 | | Cyclohexanone/Methylene Chloride | 50:50 | 90 | 5 | 5 | — |
| 2 | | Cyclohexanone/Methylene Chloride | 50:50 | 85 | 5 | 10 | — |
| 3 | | Cyclohexanone/Methylene Chloride | 50:50 | 93 | 5 | — | 2 |
| 4 | | Cyclohexanone/Methylene Chloride | 50:50 | 92 | 4.5 | 3 | 0.5 |
| 5 | | Cyclohexanone/Methylene Chloride | 50:50 | 87 | 4 | 8 | 1 |
| 6 | | Ethanol/Methylene Choride | 20:80 | 90 | 5 | 5 | — |
| 7 | | Ethanol/Methylene Chloride | 20:80 | 85 | 5 | 10 | — |
| 8 | | Ethanol/Methylene Chloride | 20:80 | 93 | 5 | — | 2 |
| 9 | | Ethanol/Methylene Chloride | 20:80 | 92 | 4.5 | 3 | 0.5 |

TABLE II

| Example | Comparison Example | Adhesion Stability (N/mm) Aging | Heat Storage | Dewaxing |
|---|---|---|---|---|
| | A | | No Adhesion | |
| | B | 1.5 | 1.4 | 0.4 |
| 1 | | 1.2 Sb+ | 1.5 Sb | 1.2 Sb |
| 2 | | 1.2 Sb | 1.5 Sb | 1.5 Sb |
| 3 | | 1.2 Sb | 1.4 Sb | 1.6 Sb |
| 4 | | 1.3 Sb | 1.5 Sb | 1.5 Sb |
| 5 | | 1.3 Sb | 1.6 Sb | 1.5 Sb |
| 6 | | 1.4 Sb | 1.4 Sb | 1.3 Sb |
| 7 | | 1.3 Sb | 1.5 Sb | 1.4 Sb |
| 8 | | 1.5 Sb | 1.6 Sb | 1.6 Sb |
| 9 | | 1.4 Sb | 1.6 Sb | 1.5 Sb |

The embodiments of the invention in which an exclusive privilege or property is claimed are defined as follows:

1. An adhesive product comprising, based on the total weight,
   (a) 1 to 10 percent by weight of an aminoalkyltrialkoxysilane,
   (b) 1 to 20 percent by weight of a fine particle size polyvinylchloride powder, and/or
   (c) 0.1 to 5 percent by weight of an amorphous hydrophobic silicic acid, and
   (d) 98 to 65 percent by weight of at least one organic solvent.

2. The adhesive product of claim 1 comprising, based on the total weight,
   (a) 1 to 5 percent by weight of an aminoalkyltrialkoxysilane,
   (b) 1 to 5 percent by weight of a fine particle size polyvinylchloride powder and/or
   (c) 0.1 to 2 percent by weight of an amorphous hydrophobic silicic acid and
   (d) 98 to 88 percent by weight of at least one organic solvent.

3. The adhesive product of claims 1 and 2 wherein the aminoalkyltrialkoxysilane is γ-aminopropyltriethoxysilane.

4. The adhesive product of any one of claims 1 through 3 wherein mixtures of
   (e) dimethylformamide, tetrahydrofuran and/or cyclohexane and
   (f) methylene chloride
are used as the organic solvent (d).

5. The adhesive product of claim 4 wherein the solvent mixture comprises 80 to 40 percent by weight of methylene chloride based on the total weight of the solvent.

6. An adhesive product comprising
   (a) 1 to 10 percent by weight of γ-aminopropyltriethoxysilane,
   (b) 1 to 20 percent by weight of a fine particle size polyvinyl chloride powder,
   (c) 0.1 to 5 percent by weight of an amorphous hydrophobic silicic acid, and
   (d) 98 to 65 percent by weight of a solvent mixture of cyclohexanone/methylene chloride in a weight ratio of approximately 50:50.

7. A process for improving the adhesiveness of cellular or noncellular polyurethanes to solid cover layers of all types wherein the improvement comprises treating the cover layers with an adhesive product comprising, based on the total weight,
   (a) 1 to 10 percent by weight of an aminoalkyltrialkoxysilane,
   (b) 1 to 20 percent by weight of a fine particle size polyvinyl chloride powder, and/or
   (c) 0.1 to 5 percent by weight of an amorphous hydrophobic silicic acid, and
   (d) 98 to 65 percent by weight of at least one organic solvent
prior to the addition of the polyurethane materials.

8. The process of claim 7 wherein the adhesive product comprises
  (a) 1 to 5 percent by weight of an aminoalkyltrialkoxysilane,
  (b) 1 to 5 percent by weight of a fine particle size polyvinylchloride powder and/or
  (c) 0.1 to 2 percent by weight of an amorphous hydrophobic silicic acid and
  (d) 98 to 88 percent by weight of at least one organic solvent.

9. The process of claim 7 wherein the aminoalkyltrialkoxysilane is γ-aminopropyltriethoxysilane.

10. The process of claim 7 wherein mixtures of
  (e) dimethylformamide, tetrahydrofuran and/or cyclohexane and
  (f) methylene chloride are used as the organic solvent (d).

11. The process of claim 7 wherein the solvent comprises 80 to 40 percent by weight of methylene chloride based on the total weight of the solvent.

12. The process of claim 7 wherein the adhesive product comprises
  (a) 1 to 10 percent by weight of γ-aminopropyltriethoxysilane,
  (b) 1 to 20 percent by weight of a fine particle size polyvinyl chloride powder,
  (c) 0.1 to 5 percent by weight of an amorphous hydrophobic silicic acid, and
  (d) 98 to 65 percent by weight of a solvent mixture of cyclohexanone/methylene chloride in a weight ratio of approximately 50:50.

* * * * *

UNITED STATES PATENT AND TRADEMARK OFFICE
CERTIFICATE OF CORRECTION

PATENT NO. : 4,341,686

DATED : July 27, 1982

INVENTOR(S) : Sarbananda Chakrabarti, John Hutchison, Otto Volkert

It is certified that error appears in the above—identified patent and that said Letters Patent is hereby corrected as shown below:

Claim 4, line 1, delete "any one of"

Signed and Sealed this

Twelfth Day of October 1982

[SEAL]

Attest:

GERALD J. MOSSINGHOFF

*Attesting Officer*   *Commissioner of Patents and Trademarks*